March 9, 1971     B. JERABEK     3,568,413
SUCTION CLEANERS
Filed July 23, 1969     2 Sheets-Sheet 1
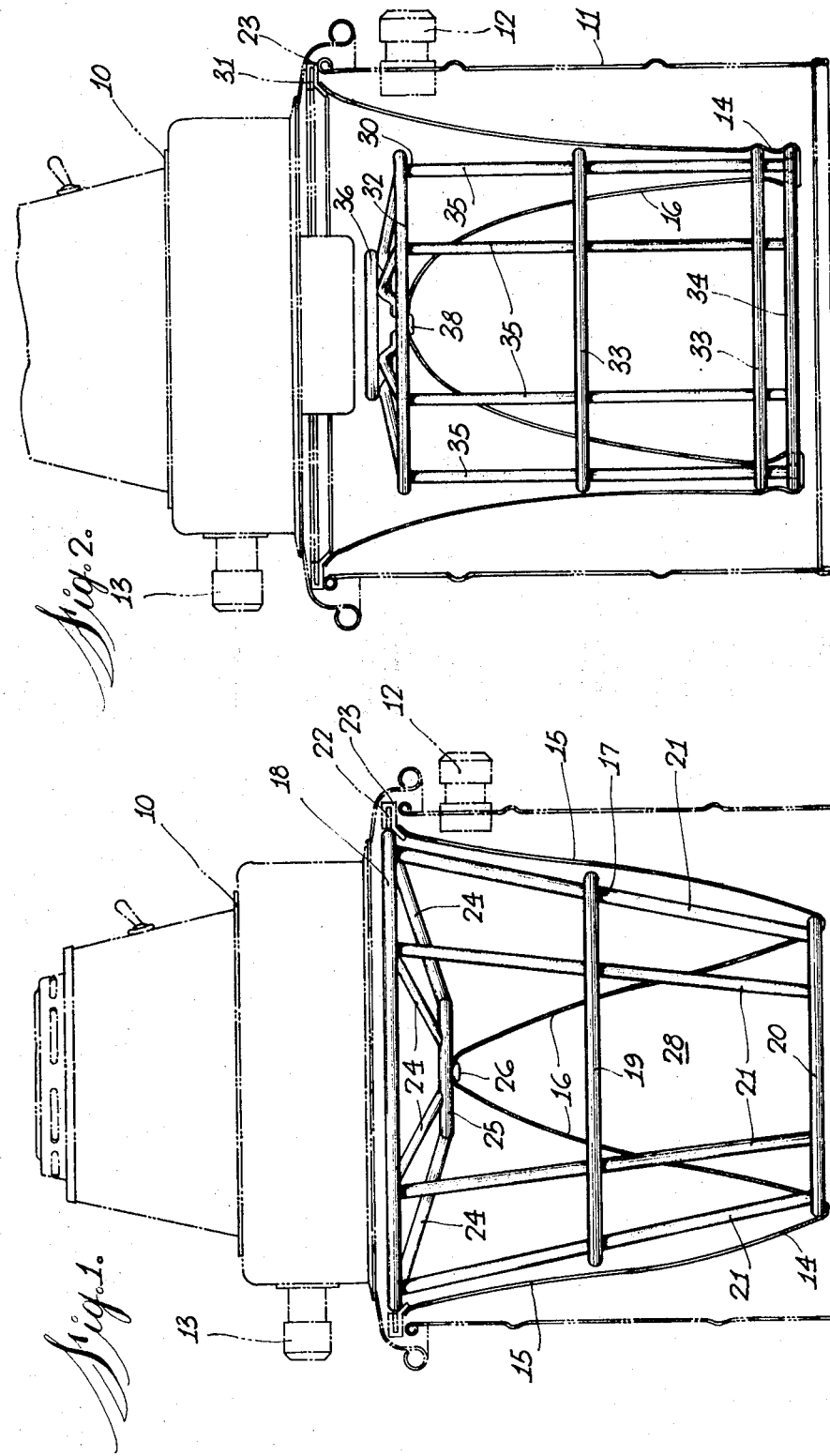

March 9, 1971  B. JERABEK  3,568,413
SUCTION CLEANERS

Filed July 23, 1969  2 Sheets-Sheet 2

United States Patent Office 3,568,413
Patented Mar. 9, 1971

3,568,413
SUCTION CLEANERS
Bohumil Jerabek, Scarborough, Ontario, Canada, assignor to Dustbane Enterprises Limited, Ottawa, Ontario, Canada
Filed July 23, 1969, Ser. No. 844,131
Int. Cl. B01d 46/04
U.S. Cl. 55—288                                      3 Claims

ABSTRACT OF THE DISCLOSURE

A filter for gas cleaners, particularly air cleaners for industrial and domestic cleaners, in which the filter has an outer depending tubular part and an inner re-entrant tubular part extending upwards inside of and spaced from the outer part. There is thus a flow reversal into the inner part which slows down the gas flow with improved filtering. As an additional feature to improve self-cleaning of the filter a freely supported frame can be positioned between the inner and outer parts, the frame being lifted during the operation of the apparatus and dropping when the apparatus is shut off. This agitates the filter and causes dust and other material to fall off the filter.

---

This invention relates to air cleaners, and particularly to filter elements for such cleaners and to frames or cages used to maintain filter elements in an extended condition.

In mobile cleaners, both domestic and industrial, there is considerable difficulty in providing a satisfactory relationship between air flow and filter area. For efficient pickup of dirt and other material there is a minimum predetermined air flow for a particular-diameter of pipe or tube, to which cleaning tools are connected. At the same time, due to space restrictions, the filter area is restricted. As a result the relationship between air flow and filter area is one which results in fairly rapid blinding of the filter. In some machines this happens very quickly, and because of such blinding the air flow is reduced. Satisfactory cleaning is thus not obtained.

It is possible to improve, temporarily, the cleaning efficiency by turning off the cleaner and agitating the filter. In some machines even this is not effective. In machines in which it is effective, to a greater or lesser extent, the filter soon becomes blinded again. As constantly stopping the machine and agitating the filter, is annoying and inconvenient, there is a tendency to keep the machine operating in its inefficient regime, as a result of which only dust and fine dirt is picked up, grit and larger dirt being left behind.

The present invention provides an improved filter which is more effective in that extra filter area is obtained for a particular-size of apparatus and also a particular form of filter is used which reduces or prevents complete blinding of the filter. The invention also provides an arrangement for filter frames or cages which provides a self-cleaning characteristic to the filter unit.

In accordance with one feature of the present invention, there is provided a filter for a cleaner comprising a first, outer, truncated conical member, the narrower end of the member extending away from the air outlet from the filter chamber, and a second, inner, conical member, the base of the second conical member connected to the narrower end of the first member, the top of the second member extending towards the air outlet. Thus the filter element comprises a double cone which, for convenience, is described as comprising first and second conical members, but can comprise a single concial member, part of which is turned back inside the other part. The filter element is capable of use both in suction and pressure cleaners.

In accordance with another feature of the invention there is provided a cage or frame for positioning within a filter element to maintain the filter element in an extended condition against the effect of air flow through the filter, the cage or frame being freely supported in the filter element below the air outlet of the filter chamber, the arrangement such that on commencement of air flow through the filter chamber and the air outlet, the filter element partially collapses and lifts the frame or cage up a predetermined distance, the cage or frame dropping down on shutting off of the air flow, and thereby agitating the filter element. This arrangement of the cage or frame can be used both in suction and pressure cleaners.

It is also commented that, although the various features of the present invention are particularly applicable to mobile cleaners, generally of the suction type, they are also applicable to stationary cleaners including large industrial cleaners.

The invention will be readily understood by the following description of certain embodiments, by way of example, in conjunction with the accompanying drawings, in which:

FIG. 1 is a side view of one form of a cleaner, the motor and fan unit in phantom, the container in phantom cross-section, and the filter in cross-section to show the cage or frame;

FIG. 2 is a view similar to that of FIG. 1 illustrating another form of cleaner, with a freely supported cage or frame.

Figure 3:
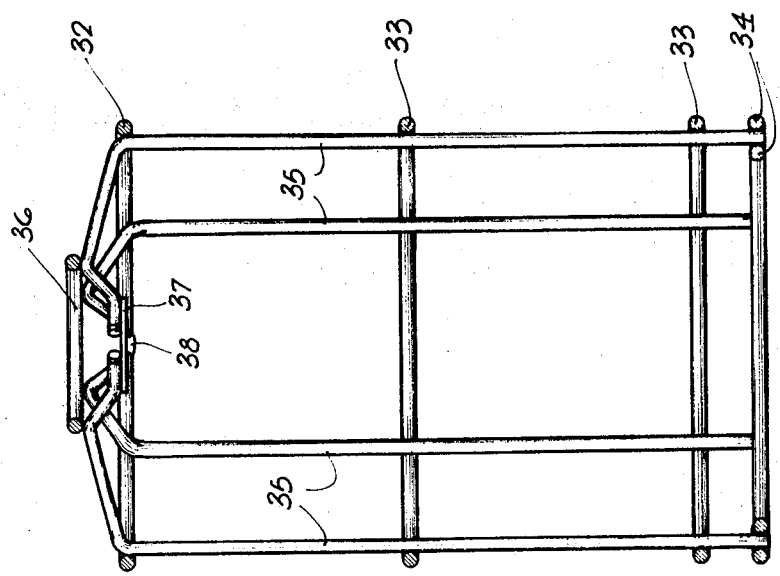
FIG. 3 is a cross-section through a cage or frame, as used in the cleaner of FIG. 2, the cross-section on the longitudinal axis of the cage or frame.

As illustrated in FIG. 1, a motor and fan unit 10 is mounted on a container 11. An inlet 12 is provided for the connection of flexible hose and tools, air exhausting through outlet 13. Situated within the container 11 is a filter 14. It will be seen that the filter 14 comprises two parts, an outer conical part 15 and an inner conical part 16. The outer part 15 tapers downwardly and inwardly while the inner part 16 tapers upwardly and inwardly. Conveniently the two parts 15 and 16 are formed as one conical unit, with the narrower end turned in. Alternately two separate parts can be made and joined together, for example, at the junction of parts 15 and 16.

The filter is held extended by a frame or cage 17. The frame 17 is formed of top, intermediate and lower circular wire members 18, 19 and 20 respectively, connected by vertical wire members 21. The members 18, 19, 20 and 21 are assembled by brazing or welding, or by any other convenient method. Attached to the top member 18 is an annular ring 22, of rigid material, for example metal. The filter 15 is removably attached to the annular ring 22 by a molded resilient ring 23. The ring 23 also conveniently forms a seal between the motor and fan unit 10 and the container 11.

The cage or frame 17 has a series of radially extending wire members 24 supporting a central circular member 25. A disc, not shown, is attached to the member 25 and carries at its centre one half of a press fastener 26. The other half of the press fastener 26 is attached to the narrow end of the filter. Connection of the two halves of the fastener 26 retains the inner part 16 of the filter in position.

In operation, air is drawn in through the inlet 12, via a flexible tube and cleaning tools connected thereto. The air passes down and around the filter 14. Some of the air passes through the outer part 15, depositing collected dirt on the filter. The remainder of the air passes below the bottom of the filter and up into chamber 28 inside of the inner part 16, passing through the inner part to join the air which has passed through the outer part 15. The air then flows to the suction fan in the motor and fan unit 10, finally exhausting through outlet 13.

The inner part 16 of the filter 14, one of the features of the present invention, provides several advantages, and improvements in operation, Firstly, there is a direct increase in fillter area, as compared with a normal filter which is formed only by an element corresponding to the outer part 15, a flat panel extending across the bottom of the filter to form a complete element. This increase in filter area is obtained without any increase in size of the apparatus.

Another advantage is that the cyclone effect within chamber 28 is much reduced. As a result the larger dirt particles settle out of the air flow before meeting the filter. Also, the speed of the air in the chamber 28 is reduced. The impingement of the air on the filter is reduced and thus there is reduced blinding of the filter, or the filter operates longer before becoming blinded.

The increase in filter area also reduces the overall impingement effect of the air on the filter. There is a considerable increase in self-cleaning when the motor and fan unit is shut off, normal movement of the machine causing a large part of the dirt on the filter to fall off.

In FIG. 2, the motor and fan unit 10 and the container 11 are the same as in FIG. 1. An inlet 12 is provided and an outlet 13. The filter 14 is also of the same form as that in FIG. 1, that is in two parts 15 and 16. However, as explained below, a different form of filter can be used.

The first difference in FIG. 2 is that the cage or frame 30 is entirely separate from ring 31 to which is attached the filter 14. Cage or frame 30 is formed of upper, intermediate and lower circular wire members 32, 33 and 34, respectively, joined by vertical wire members 35. As seen more clearly in FIG. 3, there are two lower circular wire members 34, one on the inside and one on the outside of vertical members 35. Also, one of the intermediate circular members 33 is positioned slightly above the lower members 34 for a reason disclosed later.

The vertical members 35 are bent over at their top ends being attached to a circular wire member 36, and then being bent downwards to finally be attached to a circular plate 37. To the centre of the underside of plate 37 is attached half of a press fastener 38. The other half of the press fastener is attached to the end of filter 14.

As stated, the ring 31 is separated from the frame or cage 30. The filter 14 is attached to the ring 31 by means of molded resilient ring 23, as in FIG. 1.

When the cleaner is in the off condition, the cage or frame 30 is suspended in the filter 14, and is free to wobble about as the machine is moved. When the motor and fan unit is switched on, the pressure drop across the filter 14 is sufficient for the filter to start to collapse and lift the cage or frame 30 upwards. As soon as the cage or frame has lifted a predetermined amount, for example, 2 inches, the ring 36 contacts the housing 39 of the inlet to the fan. This prevents further rise of the cage or frame 30. Because of this lifting of the cage or frame, the filter is slightly collapsed and has a creased or forrowed condition. This gives some resilience to the filter and reduces damage thereto by large pieces of matter drawn in by the cleaner. As the filter 14 has this slightly collapsed condition, the two lower rings 34 and lower intermediate ring 35, referred to above, act to prevent the lower portions of the inner and outer filter parts 15 and 16 from contacting each other and reducing the effective area of the filter.

When the motor and fan unit is switched off, the cage or frame 30 drops down. This both removes the creases or furrows from the filter 14 and also agitates the filter. This action produces a cleaning effect and causes much of the dirt to fall off the filter.

As stated above, it is possible to use a filter of alternate form to that of FIG. 2, with a freely suspended cage or frame. Thus, for example, in machines hitherto used, a fixed frame or cage has been provided, often of a shape of the frame or cage 17 in FIG. 1, and with a plain filter in the form of a truncated cone which fits over the cage, having a flat bottom. It is possible to replace the fixed frame or cage by a loose frame or cage, using the existing form of filter, and obtain the advantages of improved self-cleaning.

It has been found that further improvements in self-cleaning ability can be obtained by using a material for the filter which has a nap on one side, the nap being positioned on the outside of the filter, that is on the upstream side. It is believed that the nap assists self-cleaning in that the dirt does not get so firmly embedded and also the agitation of the filter assists the nap in dislodging the dirt.

An indication of the effectiveness of the self-cleaning can be obtained from the following results, in a cleaner having both the improved filter and the free cage or frame, as in FIG. 2. The cleaner was run, picking up a fine powder until the air flow was reduced to the minimum for pick-up. After stopping the fan and then restarting, without any external agitation, the air flow was restored 55% of the difference between the original flow and the minimum flow. With a slight external agitation, as by rocking the machine three or four times, the restoration was approximately 98%. With the next stop, after the air flow had again dropped to the minimum, restoration was approximately 43% without agitation and approximately 100% with agitation. A third stop produced restorations of approximately 50% and 100%, respectively.

It will be seen that a considerable improvement is obtained. In conventional machines, the filter rapidly becomes blinded, and thereafter only dust is collected, grit and other larger foreign matter not being picked up. It is the grit and similar material which does most damage, particularly to carpets and rugs. To restore the effectiveness of conventional filters considerable agitation is necessary, and even then only partial restoration of air flow occurs. To properly clear the filter it is necessary to dismantle the machine and directly agitate or beat the filter, which is very inconvenient.

With cleaners embodying the present invention, when it is desired to empty the canister, the motor and fan unit can be removed without removal of the filter, an advantage not normally available in conventional machines. The filter can then be shaken, without any dust or other matter escaping, and the filter is then removed. The container is then emptied.

Although the improved filter has been described as used in a relatively small, mobile, cleaner, this form of filter can be used in larger cleaners and can also be used in large, or small, static cleaners, such as air cleaners used in industry. The advantages of increased filter area without increase in overall physical dimensions, and the reduced vortex effect and lower air speed all improve the effectiveness of such cleaners. Again, although the invention has been described for suction cleaners, that is the air is drawn through the filter, the invention can be applied to air cleaners in which the air is blown through the filter. Where the filter is mounted vertically in such static cleaners, the loose frame or cage can also be used.

I claim:

1. A suction cleaner comprising an upper fan housing mounted on a lower filter container, a filter bag suspendably mounted in said container and having the periphery of its open end mounted on top of the container, a cage disposed within and only supported by said bag and having an upper frame member adjacent said bag open end and spaced therefrom, a lower frame member and side frame members connecting said upper and lower frame members, said bag having an outer portion surrounding said cage and an inner partially inverted portion disposed within said side frame members and extending from said lower frame member to said upper frame member and secured to said upper frame member, said cage and bag having limited lateral swinging movement with respect to said container, said cage having limited perpendicular movement relatively to said housing, an air inlet in said container externally of said filter bag and an air outlet in said fan housing, said bag portions being partially collapsible about said cage and lifting movement being imparted to said cage by said bag portions in response to air flow through said container from said inlet to said outlet.

2. A suction cleaner as defined in claim 1, said container being of cylindrical form and having a closed bottom end and an open top end, said bag having a ring attached to the mouth end thereof and seated on said top end of said container, said fan housing being removably mounted on said top end of said container.

3. A suction cleaner as defined claim 1, said fan housing having an inlet portion extending into said bag mouth and engageable by said cage to limit said lifting movement thereof.

References Cited

UNITED STATES PATENTS

| | | | |
|---|---|---|---|
| 1,886,884 | 11/1932 | Jones | 55—288 |
| 2,044,827 | 6/1936 | Adams | 55—378 |
| 2,532,264 | 11/1950 | Smith | 55—379 |
| 3,046,718 | 7/1962 | Ide et al. | 55—470 |
| 3,320,725 | 5/1967 | Foster | 55—288 |
| 3,358,316 | 12/1967 | Okun | 55—288 |
| 3,385,039 | 5/1968 | Burke et al. | 55—502 |

FOREIGN PATENTS

| | | | |
|---|---|---|---|
| 107,438 | 10/1927 | Austria | 55—379 |

FRANK W. LUTTER, Primary Examiner

B. NOZICK, Assistant Examiner

U.S. Cl. X.R.

15—327; 55—373, 379, 467, 500, 529